US012348608B2

(12) United States Patent
Menes et al.

(10) Patent No.: US 12,348,608 B2
(45) Date of Patent: Jul. 1, 2025

(54) SECURE AND EFFICIENT DISTRIBUTED PROCESSING

(71) Applicant: MELLANOX TECHNOLOGIES, LTD., Yokneam (IL)

(72) Inventors: Miriam Menes, Tel Aviv (IL); Liran Liss, Atzmon (IL); Noam Bloch, Bat Shlomo (IL); Idan Burstein, Akko (IL); Boris Pismenny, Haifa (IL); Ariel Shahar, Jerusalem (IL)

(73) Assignee: Mellanox Technologies, Ltd., Yokneam (IL)

( * ) Notice: Subject to any disclaimer, the term of this patent is extended or adjusted under 35 U.S.C. 154(b) by 497 days.

(21) Appl. No.: 17/899,648

(22) Filed: Aug. 31, 2022

(65) Prior Publication Data

US 2023/0185606 A1    Jun. 15, 2023

(30) Foreign Application Priority Data

Dec. 14, 2021   (IL) .......................................... 289002

(51) Int. Cl.
*H04L 9/00* (2022.01)
*G06F 9/38* (2018.01)
(Continued)

(52) U.S. Cl.
CPC .............. *H04L 9/00* (2013.01); *G06F 9/3877* (2013.01); *G06F 9/4881* (2013.01);
(Continued)

(58) Field of Classification Search
CPC ... H04L 9/00; H04L 9/006; H04L 9/08; H04L 9/0816; G06F 9/3877; G06F 9/4881; G06F 9/5072
See application file for complete search history.

(56) References Cited

U.S. PATENT DOCUMENTS

| 6,002,768 A | * | 12/1999 | Albanese | ........... | H04N 21/2543 |
| | | | | | 348/E7.071 |
| 6,240,188 B1 | * | 5/2001 | Dondeti | .............. | H04L 63/0823 |
| | | | | | 380/278 |

(Continued)

FOREIGN PATENT DOCUMENTS

| CN | 101964803 A | 2/2011 |
| CN | 110493272 A | 11/2019 |

(Continued)

OTHER PUBLICATIONS

Li, Bojie, et al. "Kv-direct: High-performance in-memory key-value store with programmable nic." Proceedings of the 26th Symposium on Operating Systems Principles. 2017.*

(Continued)

*Primary Examiner* — Jimmy H Tran
(74) *Attorney, Agent, or Firm* — Meitar Patents Ltd.; Daniel Kligler

(57) ABSTRACT

In one embodiment, a secure distributed processing system includes nodes connected over a network, and configured to process tasks, each respective one of the nodes including a respective processor to process data of respective ones of the tasks, and a respective network interface controller to connect to other nodes over the network, store task master keys for use in computing communication keys for securing data transfer over the network for respective ones of the tasks, compute respective task and node-pair specific communication keys for securing communication with respective ones of the nodes over the network for respective ones of the tasks responsively to respective ones of the task master keys and node-specific data of respective node pairs, and securely communicate the processed data of the respective ones of the tasks with the respective ones of the nodes over the (Continued)

network responsively to the respective task and node-pair specific communication keys.

24 Claims, 5 Drawing Sheets

(51) Int. Cl.
  *G06F 9/48* (2006.01)
  *G06F 9/50* (2006.01)
  *H04L 9/08* (2006.01)
(52) U.S. Cl.
  CPC .......... *G06F 9/5027* (2013.01); *G06F 9/5072* (2013.01); *H04L 9/006* (2013.01); *H04L 9/08* (2013.01); *H04L 9/0816* (2013.01); *H04L 9/0861* (2013.01)

(56) References Cited

U.S. PATENT DOCUMENTS

| | | | | |
|---|---|---|---|---|
| 6,975,728 | B1* | 12/2005 | Eye | H04L 9/088 380/284 |
| 8,074,073 | B2* | 12/2011 | Gentry | H04L 9/3073 713/170 |
| 8,250,556 | B1* | 8/2012 | Lee | G06F 12/0837 717/161 |
| 8,418,252 | B2* | 4/2013 | Akyol | H04L 63/0428 713/188 |
| 8,848,922 | B1* | 9/2014 | Durgin | G06F 21/6218 380/278 |
| 9,110,860 | B2* | 8/2015 | Shahar | H04L 45/00 |
| 9,882,713 | B1* | 1/2018 | Raza | H04L 63/06 |
| 10,148,736 | B1* | 12/2018 | Lee | G06F 9/5066 |
| 10,931,450 | B1* | 2/2021 | Chellappa | H04L 63/068 |
| 2005/0204161 | A1* | 9/2005 | Caronni | H04L 9/0822 726/5 |
| 2009/0106551 | A1* | 4/2009 | Boren | H04L 9/321 380/259 |
| 2014/0096182 | A1* | 4/2014 | Smith | H04L 63/0853 726/1 |
| 2014/0215477 | A1* | 7/2014 | Chen | G06F 9/5066 718/102 |
| 2014/0358977 | A1* | 12/2014 | Cramer | G06F 16/24578 707/827 |
| 2017/0063843 | A1* | 3/2017 | Vijayasankar | H04L 63/0823 |
| 2018/0081715 | A1* | 3/2018 | LeBeane | G06F 9/505 |
| 2018/0131516 | A1* | 5/2018 | Meng | H04L 9/0643 |
| 2019/0238323 | A1* | 8/2019 | Bunch | H04L 9/0825 |
| 2020/0076582 | A1* | 3/2020 | Driever | H04L 63/061 |
| 2020/0076618 | A1* | 3/2020 | Driever | H04L 9/0631 |
| 2020/0076807 | A1* | 3/2020 | Driever | H04L 9/085 |
| 2020/0186335 | A1* | 6/2020 | Destefanis | H04L 9/0637 |
| 2020/0267542 | A1* | 8/2020 | Pronk | H04W 12/037 |
| 2021/0120077 | A1* | 4/2021 | Guim Bernat | H04L 63/0435 |
| 2021/0176217 | A1* | 6/2021 | Liu | H04L 12/18 |
| 2021/0176632 | A1* | 6/2021 | Liu | H04W 12/0471 |
| 2021/0266147 | A1* | 8/2021 | Zee | H04L 9/3268 |
| 2021/0266152 | A1* | 8/2021 | Sczepczenski | H04L 9/0894 |
| 2021/0266154 | A1* | 8/2021 | Sczepczenski | H04L 63/205 |
| 2021/0266161 | A1* | 8/2021 | Zee | H04L 9/0891 |
| 2021/0266177 | A1* | 8/2021 | Sczepczenski | H04L 63/205 |
| 2021/0266304 | A1* | 8/2021 | Zee | H04L 63/164 |
| 2021/0328783 | A1* | 10/2021 | Doshi | H04L 9/0861 |
| 2021/0367772 | A1* | 11/2021 | Wright | H04L 9/085 |
| 2022/0006626 | A1* | 1/2022 | Zee | H04L 63/126 |
| 2022/0045844 | A1* | 2/2022 | Menes | H04L 9/0625 |
| 2022/0188815 | A1* | 6/2022 | Higgins | G06F 21/64 |
| 2022/0294617 | A1* | 9/2022 | Parry | H04L 9/0855 |
| 2022/0353077 | A1* | 11/2022 | Oluyemi | G06F 21/41 |
| 2023/0319023 | A1* | 10/2023 | Bursell | H04L 63/045 713/150 |
| 2024/0113902 | A1* | 4/2024 | Michaelis | H04L 9/0825 |
| 2024/0146519 | A1* | 5/2024 | Pascucci | H04L 63/062 |
| 2024/0220973 | A1* | 7/2024 | Yeshayahu | G06Q 20/367 |

FOREIGN PATENT DOCUMENTS

| | | |
|---|---|---|
| CN | 110752924 A | 2/2020 |
| CN | 111343207 A | 6/2020 |
| CN | 112218295 A | 1/2021 |
| CN | 113220431 A | 8/2021 |
| CN | 113613214 A | 11/2021 |

OTHER PUBLICATIONS

Song, Heqing, Jifei Li, and Haoteng Li. "A cloud secure storage mechanism based on data dispersion and encryption." IEEE Access 9 (2021): 63745-63751.*
Pirelli, Solal, and George Candea. "A Simpler and Faster {NIC} Driver Model for Network Functions." 14th USENIX Symposium on Operating Systems Design and Implementation (OSDI 20). 2020.*
Barati, Hamid. "A hierarchical key management method for wireless sensor networks." Microprocessors and Microsystems 90 (2022): 104489.*
Atallah, Mikhail J., et al. "Dynamic and efficient key management for access hierarchies." ACM Transactions on Information and System Security (TISSEC) 12.3 (2009): 1-43.*
Zhu, Qi, et al. "Optimization of task allocation and priority assignment in hard real-time distributed systems." ACM Transactions on Embedded Computing Systems (TECS) 11.4 (2013): 1-30.*
Zhu, Sencun, et al. "Establishing pairwise keys for secure communication in ad hoc networks: A probabilistic approach." 11th IEEE International Conference on Network Protocols, 2003. Proceedings. IEEE, 2003.*
Liu, Donggang, Peng Ning, and Rongfang Li. "Establishing pairwise keys in distributed sensor networks." ACM Transactions on Information and System Security (TISSEC) 8.1 (2005): 41-77.*
Zhao, Chuan, et al. "Secure multi-party computation: theory, practice and applications." Information Sciences 476 (2019): 357-372.*
Hirshberg et al., U.S. Appl. No. 17/699,517, filed Mar. 21, 2022.
Pismenny et al., U.S. Appl. No. 17/676,890, filed Feb. 22, 2022.
CN Application # 202211537959.X Office Action dated May 27, 2025.

* cited by examiner

SECURE AND EFFICIENT DISTRIBUTED PROCESSING

RELATED APPLICATION INFORMATION

The present application claims priority from Israel Patent Application 289,002 filed Dec. 14, 2021, the disclosure of which is hereby incorporated herein by reference.

FIELD OF THE INVENTION

The present invention relates to computer systems, and in particular, but not exclusively to, distributed processing.

BACKGROUND

In some computer systems, processors (e.g., central processing units (CPUs) and/or graphics processing units (GPUs)) in different respective processing nodes may collaborate under the orchestration of a centralized entity, for example, to perform processing tasks such that one part of a processing task is performed by one processor in one processing node, and another part of the processing task is performed by another processor in another processing node, and so on. Parallelizing a computing task among multiple nodes helps to reduce task execution time, and enables execution of large computing tasks in reasonable run times.

The processing nodes may be connected via a wired and/or wireless network and may process one or more processing tasks simultaneously, or at different times. Data processed by one of the processing nodes may be passed to one or more other processing nodes for further processing. The data passed between processing nodes may be secured.

U.S. Pat. No. 9,110,860 to Shahar describes a computing method including accepting a notification of a computing task for execution by a group of compute nodes interconnected by a communication network, which has a given interconnection topology and includes network switching elements. A set of preferred paths, which connect the compute nodes in the group via at least a subset of the network switching elements to one or more root switching elements, are identified in the communication network based on the given interconnection topology and on a criterion derived from the computing task. The network switching elements in the subset are configured to forward node-level results of the computing task produced by the compute nodes in the group to the root switching elements over the preferred paths, so as to cause the root switching elements to calculate and output an end result of the computing task based on the node-level results.

U.S. Pat. No. 8,250,556 to Lee, et al., describes a system comprising a plurality of computation units interconnected by an interconnection network. A method for configuring the system comprises receiving an initial partitioning of instructions into initial subsets corresponding to different portions of a program; forming a refined partitioning of the instructions into refined subsets each including one or more of the initial subsets, including determining whether to combine a first subset and a second subset to form a third subset according to a comparison of a communication cost between the first subset and second subset and a load cost of the third subset that is based at least in part on a number of instructions issued per cycle by a computation unit; and assigning each refined subset of instructions to one of the computation units for execution on the assigned computation unit.

SUMMARY

There is provided in accordance with an embodiment of the present disclosure, a secure distributed processing system, including a plurality of nodes connected over a network, and configured to process a plurality of tasks, each respective one of the nodes including a respective processor to process data of respective ones of the tasks, and a respective network interface controller (NIC) to connect to other ones of the nodes over the network, store task master keys for use in computing communication keys for securing data transfer over the network for respective ones of the tasks, compute respective task and node-pair specific communication keys for securing communication with respective ones of the nodes over the network for respective ones of the tasks responsively to respective ones of the task master keys and node-specific data of respective pairs of the nodes, and securely communicate the processed data of the respective ones of the tasks with the respective ones of the nodes over the network responsively to the respective task and node-pair specific communication keys.

Further in accordance with an embodiment of the present disclosure each respective one of the tasks is processed as a respective distributed process by more than one of the nodes.

Still further in accordance with an embodiment of the present disclosure respective ones of the tasks are performed for tenants.

Additionally in accordance with an embodiment of the present disclosure the respective processor includes a graphics processing unit (GPU) configured to process data of respective ones of the tasks for respective ones of the tenants.

Moreover, in accordance with an embodiment of the present disclosure each respective one of the tasks is processed as a respective distributed process by more than one of the nodes.

Further in accordance with an embodiment of the present disclosure one of the nodes in each of the respective pairs of the nodes is configured to generate a respective nonce, the node-specific data of each of the respective pairs of the nodes including the respective nonce.

Still further in accordance with an embodiment of the present disclosure the node-specific data of the respective pairs of the nodes include address information of the respective pairs of the nodes.

Additionally in accordance with an embodiment of the present disclosure the node-specific data of the respective pairs of the nodes include address information of the respective pairs of the nodes.

Moreover, in accordance with an embodiment of the present disclosure the respective NIC is configured to compute the task and node-pair specific communication keys responsively to setting up new connections with the respective ones of the nodes over the network so that for each new connection with a respective one of the nodes the respective NIC is configured to compute a corresponding new task and node-pair specific communication key.

Further in accordance with an embodiment of the present disclosure the respective NIC is configured to set up a first connection with a given one of the nodes, compute a first task and node-pair specific communication key for the first connection responsively to a first nonce, securely communicate with the given one of the nodes responsively to the first task and node-pair specific communication key, dismantle the first connection, set up a second connection with a given one of the nodes, compute a second task and node-pair specific communication key for the second connection responsively to a second nonce, different to the first nonce, and securely communicate with the given one of the nodes responsively to the second task and node-pair specific communication key.

Still further in accordance with an embodiment of the present disclosure each respective one of the tasks is processed as a respective distributed process by more than one of the nodes.

Additionally in accordance with an embodiment of the present disclosure the respective NIC is configured to generate the first nonce responsively to a first connection request from the given one of the nodes, and generate the second nonce responsively to a second connection request from the given one of the nodes.

Moreover in accordance with an embodiment of the present disclosure the respective NIC is configured to compute the first task and node-pair specific communication key for the first connection responsively to the first nonce and address information of the respective node of the respective NIC and the given one of the nodes, and compute the second task and node-pair specific communication key for the second connection responsively to the second nonce and the address information of the respective node of the respective NIC and the given one of the nodes.

Further in accordance with an embodiment of the present disclosure the respective NIC is configured to reserve hardware resources responsively to a request from a given one of the nodes to establish a connection with the respective node of the respective NIC, and cancel reservation of the hardware resources after a given timeout responsively to not successfully decrypting data received from the given one of the nodes.

There is also provided in accordance with another embodiment of the present disclosure, a secure distributed processing method, including processing data of respective ones of a plurality of tasks, connecting to other ones of a plurality of nodes connected over a network, storing task master keys for use in computing communication keys for securing data transfer over the network for respective ones of the tasks, computing respective task and node-pair specific communication keys for securing communication with respective ones of the nodes over the network for respective ones of the tasks responsively to respective ones of the task master keys and node-specific data of respective pairs of the nodes, and securely communicating the processed data of the respective ones of the tasks with the respective ones of the nodes over the network responsively to the respective task and node-pair specific communication keys.

Still further in accordance with an embodiment of the present disclosure each respective one of the tasks is processed as a respective distributed process by more than one of the nodes.

Additionally in accordance with an embodiment of the present disclosure respective ones of the tasks are performed for tenants by a graphics processing unit (GPU).

Moreover, in accordance with an embodiment of the present disclosure, the method includes generating a respective nonce for each of the respective pairs of the nodes, the node-specific data of each of the respective pairs of the nodes including the respective nonce.

Further in accordance with an embodiment of the present disclosure the node-specific data of the respective pairs of the nodes include address information of the respective pairs of the nodes.

Still further in accordance with an embodiment of the present disclosure the computing includes computing the task and node-pair specific communication keys responsively to setting up new connections with the respective ones of the nodes over the network so that for each new connection with a respective one of the nodes a corresponding new task and node-pair specific communication key is computed.

Additionally in accordance with an embodiment of the present disclosure, the method includes setting up a first connection with a given one of the nodes, computing a first task and node-pair specific communication key for the first connection responsively to a first nonce, securely communicating with the given one of the nodes responsively to the first task and node-pair specific communication key, dismantling the first connection, setting up a second connection with a given one of the nodes, computing a second task and node-pair specific communication key for the second connection responsively to a second nonce, different to the first nonce, and securely communicating with the given one of the nodes responsively to the second task and node-pair specific communication key.

Moreover, in accordance with an embodiment of the present disclosure, the method includes generating the first nonce responsively to a first connection request from the given one of the nodes, and generating the second nonce responsively to a second connection request from the given one of the nodes.

Further in accordance with an embodiment of the present disclosure the computing the first task and node-pair specific communication key includes computing the first task and node-pair specific communication key for the first connection responsively to the first nonce and address information of the respective node of the respective NIC and the given one of the nodes, and the computing the second task and node-pair specific communication key includes computing the second task and node-pair specific communication key for the second connection responsively to the second nonce and the address information of the respective node of the respective NIC and the given one of the nodes.

Still further in accordance with an embodiment of the present disclosure, the method includes reserving hardware resources responsively to a request from a given one of the nodes to establish a connection, and cancelling reservation of the hardware resources after a given timeout responsively to not successfully decrypting data received from the given one of the nodes.

BRIEF DESCRIPTION OF THE DRAWINGS

The present invention will be understood from the following detailed description, taken in conjunction with the drawings in which.

DESCRIPTION OF EXAMPLE EMBODIMENTS

Overview

Figure 1:
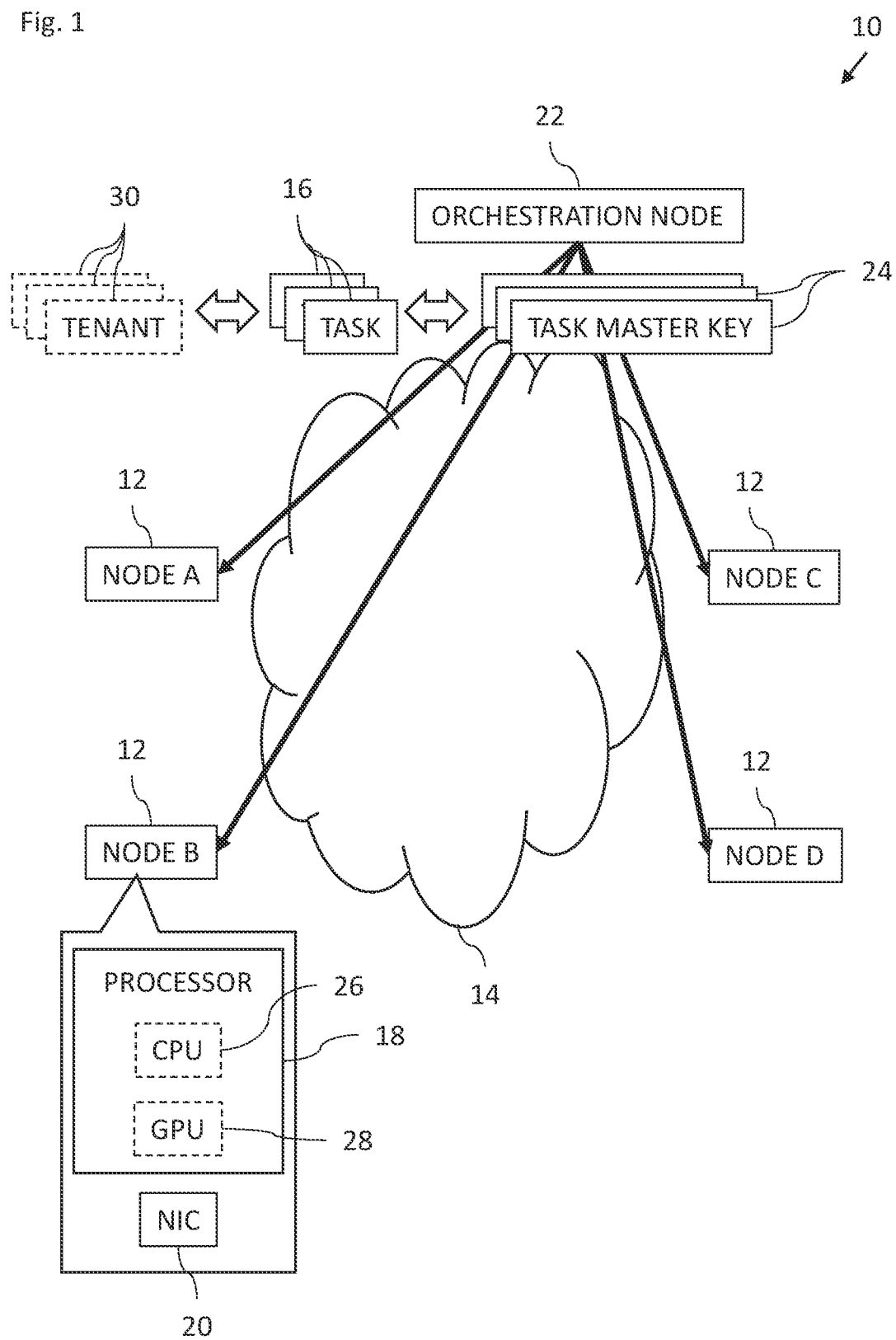
FIG. 1 is a block diagram view of a secure distributed processing system constructed and operative in accordance with an embodiment of the present invention.

High performance processing applications may be characterized by jobs or tasks being divided among multiple servers or processing nodes which process the jobs or tasks in a distributed manner. The processing nodes communicate with each other during the duration of a job or task. The communication is generally not one-to-one, but many-tomany or all-to-all among the nodes. Processing a task may involve thousands, or tens of thousands of connections. In order to communicate securely, the data exchange between the nodes is generally encrypted using a suitable key or keys.

If the same key is used by all the nodes, then security would be poor as the key may be found using known attacks. If different keys are used between different node-pairs, for example, using a secure key sharing algorithm, such as Diffie Hellman, then establishing cryptographic keys between each pair of nodes would require a large amount of memory, complexity, and processing time. For example, since every secure connection includes a state, communicating with N end nodes would require a processing node to hold N states using a large amount of memory.

Therefore, embodiments of the present invention solve the above problems by offloading data security to the processing nodes. A master key is securely distributed to each of the processing nodes for each task or job. Therefore, each processing node receives and stores a set of task master keys, with one master key for each task. When a node needs to communicate with another node, for a given task, a task and node-pair specific communication key is computed by each node based on the master key for the given task and other node-pair specific data. The key is specific for the given task and data of the node pair. The node-pair specific data may include a nonce generated by one of the nodes in the communicating node pair and/or based on address information of the node pair. The node-pair may then securely communicate using the computed task and node-pair specific communication key. Once the communication between the node pair is complete, the computed key is discarded. New communications for the same node pair or different node pairs generally result in new respective task and node-pair specific communication keys being computed by the respective node pairs.

For example, node A may send a request to node B to securely communicate for a given task. The request may include an index of the master key for the given task or an identity of the given task. Node B may then generate a random or pseudo-random nonce and responds to the request with the nonce. Node A and node B may then compute the task and node-pair specific communication key based on the master key of the given task and the generated nonce, and optionally address information of node A and/or node B. Node A may then encrypt data for the given task using the computed task and node-pair specific communication key. The data is sent to node B, which decrypts the data using the computed task and node-pair specific communication key for the given task.

InfiniBand (IB) uses Dynamic Connections (DC) to dynamically connect node pairs using less resources than static connections (e.g., InfiniBand Reliable Connections) and associating a hardware resource to a DC connection. When a dynamic connection is established, there is a short handshake including a request and acknowledgment. When the connection is finished, the hardware resource is released for use by another connection. In addition to setting up a connection between a node pair, the DC mechanism may be extended to pass a newly generated nonce per dynamic connection and thereby enable the node pairs to generate a task and node-pair specific communication key per dynamic connection. As the communication key is refreshed per dynamic connection, the key is protected against replay attacks and therefore information normally needed to be saved in the cryptographic state to prevent replay attacks is not needed. In fact, the cryptographic state may be cleared every connection thereby reducing the state data that needs to be stored by the nodes. IB DC allows holding a connection state for connections only while the nodes are transferring data. Embodiments of the present invention allow the nodes to hold the cryptographic state together with the IB-DC state for each active connection.

Embodiments of the present invention may be implemented without using IB DC. For example, other dynamic-type connections may be used, or static connections may be used. In some embodiments, multiple connections (e.g., non IB DC connections) in the same security domain may share keys.

SYSTEM DESCRIPTION

Reference is now made to FIG. 1, which is a block diagram view of a secure distributed processing system 10 constructed and operative in accordance with an embodiment of the present invention. The secure distributed processing system 10 includes a plurality of nodes 12 (only 4 shown for the sake of simplicity) connected over a network 14, and configured to process a plurality of tasks 16. In some embodiments, each task 16 may be processed as a respective distributed process by more than one of the nodes 12. Each node 12 includes a processor 18 to process data of respective ones of the tasks 16 and a network interface controller 20 (NIC) described in more detail with reference to FIGS. 2-5. The processor 18 may include a CPU 26 and/or a GPU 28.

The secure distributed processing system 10 includes an orchestration mode 22, which generates respective task master keys 24 for the tasks 16 and distributes the task master keys 24 to each of the nodes 12.

In some embodiments, tasks 16 may be performed for tenants 30. For example, the nodes 12 may process data for different tenants 30, e.g., different corporations, which rent processing space in the secure distributed processing system 10 such that each node 12 may process data for different tenants 30 at the same or different times. One of the tasks 16 may represent one, some, or all, of the processes performed for a respective tenant 30. In other words, in some embodiments, all processes of a given tenant may be classified as the same task or job. For one of the nodes 12, the GPU 28 and/or the CPU 26 of that node 12 is configured to process data of respective ones of the tasks 16 for respective ones of the tenants 30.

In practice, some or all of the functions of the processor 18 may be combined in a single physical component or, alternatively, implemented using multiple physical components. These physical components may comprise hard-wired or programmable devices, or a combination of the two. In some embodiments, at least some of the functions of the processor 18 may be carried out by a programmable processor under the control of suitable software. This software may be downloaded to a device in electronic form, over a network, for example. Alternatively, or additionally, the software may be stored in tangible, non-transitory computer-readable storage media, such as optical, magnetic, or electronic memory.

Graphics processing units (GPUs) are employed to generate three-dimensional (3D) graphics objects and two-dimensional (2D) graphics objects for a variety of applications, including feature films, computer games, virtual reality (VR) and augmented reality (AR) experiences, mechanical design, and/or the like. A modern GPU includes texture processing hardware to generate the surface appearance, referred to herein as the "surface texture," for 3D objects in a 3D graphics scene. The texture processing hardware applies the surface appearance to a 3D object by "wrapping" the appropriate surface texture around the 3D object. This process of generating and applying surface textures to 3D objects results in a highly realistic appearance for those 3D objects in the 3D graphics scene.

The texture processing hardware is configured to perform a variety of texture-related instructions, including texture operations and texture loads. The texture processing hardware generates accesses texture information by generating memory references, referred to herein as "queries," to a texture memory. The texture processing hardware retrieves surface texture information from the texture memory under varying circumstances, such as while rendering object surfaces in a 3D graphics scene for display on a display device, while rendering 2D graphics scene, or during compute operations.

Surface texture information includes texture elements (referred to herein as "texels") used to texture or shade object surfaces in a 3D graphics scene. The texture processing hardware and associated texture cache are optimized for efficient, high throughput read-only access to support the high demand for texture information during graphics rendering, with little or no support for write operations. Further, the texture processing hardware includes specialized functional units to perform various texture operations, such as level of detail (LOD) computation, texture sampling, and texture filtering.

In general, a texture operation involves querying multiple texels around a particular point of interest in 3D space, and then performing various filtering and interpolation operations to determine a final color at the point of interest. By contrast, a texture load typically queries a single texel, and returns that directly to the user application for further processing. Because filtering and interpolating operations typically involve querying four or more texels per processing thread, the texture processing hardware is conventionally built to accommodate generating multiple queries per thread. For example, the texture processing hardware could be built to accommodate up to four texture memory queries is performed in a single memory cycle. In that manner, the texture processing hardware is able to query and receive most or all of the needed texture information in one memory cycle.

Figure 2:
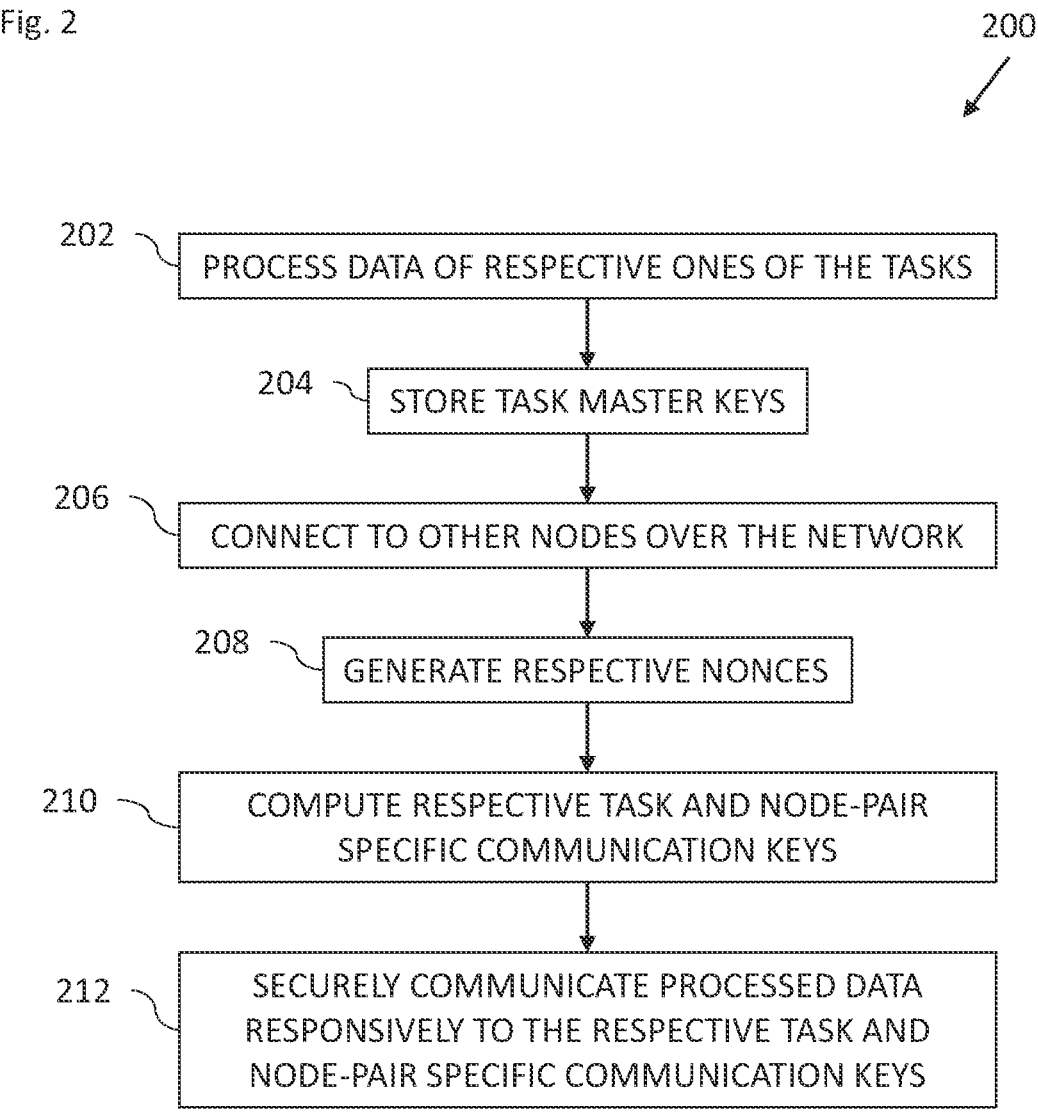
FIG. 2 is a flowchart including steps in method of operation of the system of FIG. 1.

Reference is now made to FIG. 2, which is a flowchart 200 including steps in method of operation of the system 10 of FIG. 1. The method described with reference to FIG. 2 is described for one of the nodes 12, and the processor 18 and the network interface controller 20 for that node 12.

The processor 18 is configured to process (block 202) data of respective ones of the tasks 16. The network interface controller 20 is configured to store (block 204) the task master keys 24 for use in computing communication keys for securing data transfer over the network 14 for respective ones of the tasks 16. The network interface controller 20 is configured to connect (block 206) to other nodes 12 over the network 14.

In some embodiments, the network interface controller 20 of a respective one of the nodes in each of the respective node pairs trying to set up respective connections is configured to generate (randomly or pseudo-randomly) (block 208) respective nonces (for each received connection request). For example, for a first connection between a first node pair, one of the nodes in the first node-pair generates a first nonce, and for a second connection between a second node pair, one of the nodes in the first node-pair generates a second nonce, and so on.

The network interface controller 20 is configured to compute (block 210) respective task and node-pair specific communication keys for securing communication with respective ones of the nodes 12 over the network 14 for respective ones of the tasks 16 responsively to respective ones of the task master keys 24 and node-specific data of respective pairs of the nodes. For example, the task and node-pair specific communication keys are computed by inputting respective ones of the task master keys 24 and node-specific data of respective pairs of the nodes into a suitable key computation function or algorithm. The node-specific data of each of the respective pairs of the nodes 12 may include the respective nonces and/or respective node-pair address information). The task and node-pair specific communication keys may be computed using any suitable algorithm, for example, HMAC-SHA, or CMAC.

For example, for task X between nodes A and B, the task and node-pair specific communication key is computed using the master key for task X and node-specific data of nodes A and B (e.g., including a nonce generated by node A or B), and for task Y between nodes C and B, the task and node-pair specific communication key is computed using the master key for task Y and node-specific data of nodes C and B (e.g., including a nonce generated by node C or B).

By way of another example, node A may send a request to node B to securely communicate for a given task. The request may include an index of the master key for the given task or an identity of the given task. Node B may then generate a random or pseudo-random nonce and respond to the request with the nonce. Node A and node B may then compute the task and node-pair specific communication key based on the master key of the given task and the generated nonce, and optionally address information of node A and/or node B.

In some embodiments, the network interface controller 20 is configured to compute the task and node-pair specific communication keys responsively to setting up new connections with other nodes 12 over the network 14 so that for each new connection with a respective one of the nodes 12 the network interface controller 20 is configured to compute a corresponding new task and node-pair specific communication key.

The network interface controller 20 is configured to securely communicate (block 212) the processed data of tasks 16 (or data processed by other nodes 12) with respective ones of the nodes 12 over the network 14 responsively to the respective task and node-pair specific communication keys. For example, a task and node-pair specific communication key A is used for communicating with node A for a given task, and task and node-pair specific communication key B is used for communicating with node B for the given task or a different task. By way of another example, node A may encrypt data for the given task using the computed task and node-pair specific communication key. The data is sent to node B, which decrypts the data using the computed task and node-pair specific communication key for the given task.

In some embodiments, the cryptographic state history does not need to be saved. The cryptographic state may include a replay window, which may include data for the current connection, but it is does not need to include any historical data. The cryptographic state may hold the generated nonce, a pointer to task master key, and a replay window that has been reset.

Figure 3:
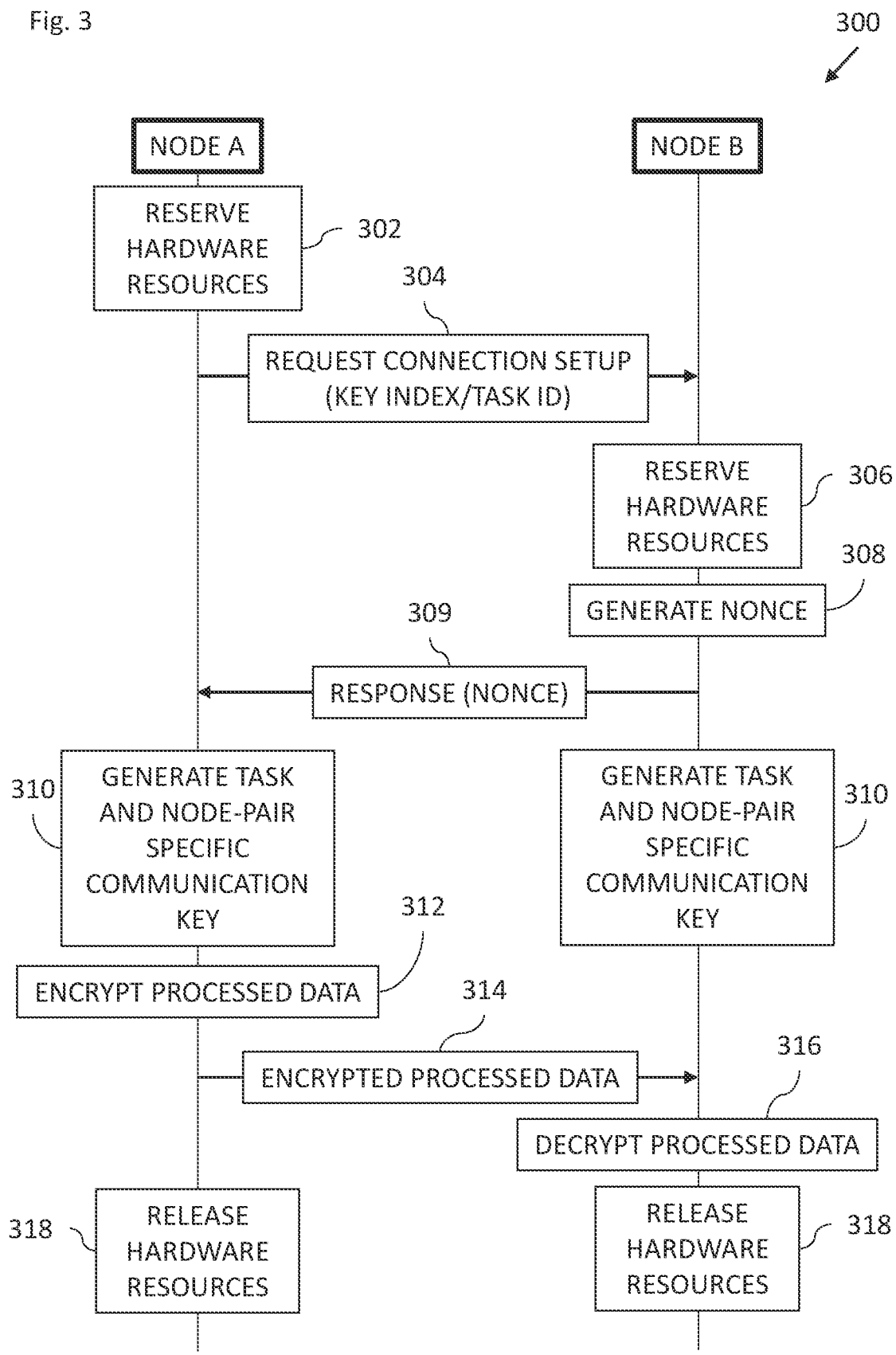
FIG. 3 is a process and information-flow flowchart for a method of operation of two nodes in the system of FIG. 1.

Reference is now made to FIG. 3, which is a process and information-flow flowchart 300 including steps in a method of operation of two nodes in the system 10 of FIG. 1. FIG. 3 shows processes performed by a node pair including node A and node B and data passed between node A and node B.

Node A is processing data for a task X. Node A reserves (block 302) hardware resources in its network interface controller 20 to set up a connection (e.g., an IB DC connection) and may optionally set up a state (e.g., a IB DC state) to handle the connection. Node A sends (block 304) a connection request to node B. The connection request includes an index to the task master key 24 relevant to task X or an identification (ID) of task X. Node B receives the request and reserves (block 306) hardware resources in its network interface controller 20 to support the requested connection and may optionally set up a state (e.g., a IB DC state) to handle the connection. Node B may release the reserved hardware resources if node A does not send relevant data within a given timeout, described in more detail with reference to FIG. 5. Node B (randomly or pseudo-randomly) generates (block 308) a nonce. Node B responds (block 309) to node A with the generated nonce. Node A and node B each generate (block 310) the same task and node-pair specific communication key based on the task master key 24 for task X, the generate nonce, and optionally address information of node A and/or node B. Node A encrypts (block 312) processed data of task X and sends (block 314) the encrypted processed data to node B. Node B receives the encrypted processed data and decrypts (block 316) the processed data. Once the communication between the nodes is completed, e.g., based on a notification from node A or node B or after a timeout of no communication, node A and node B release (block 318) the hardware resources.

Figure 4:
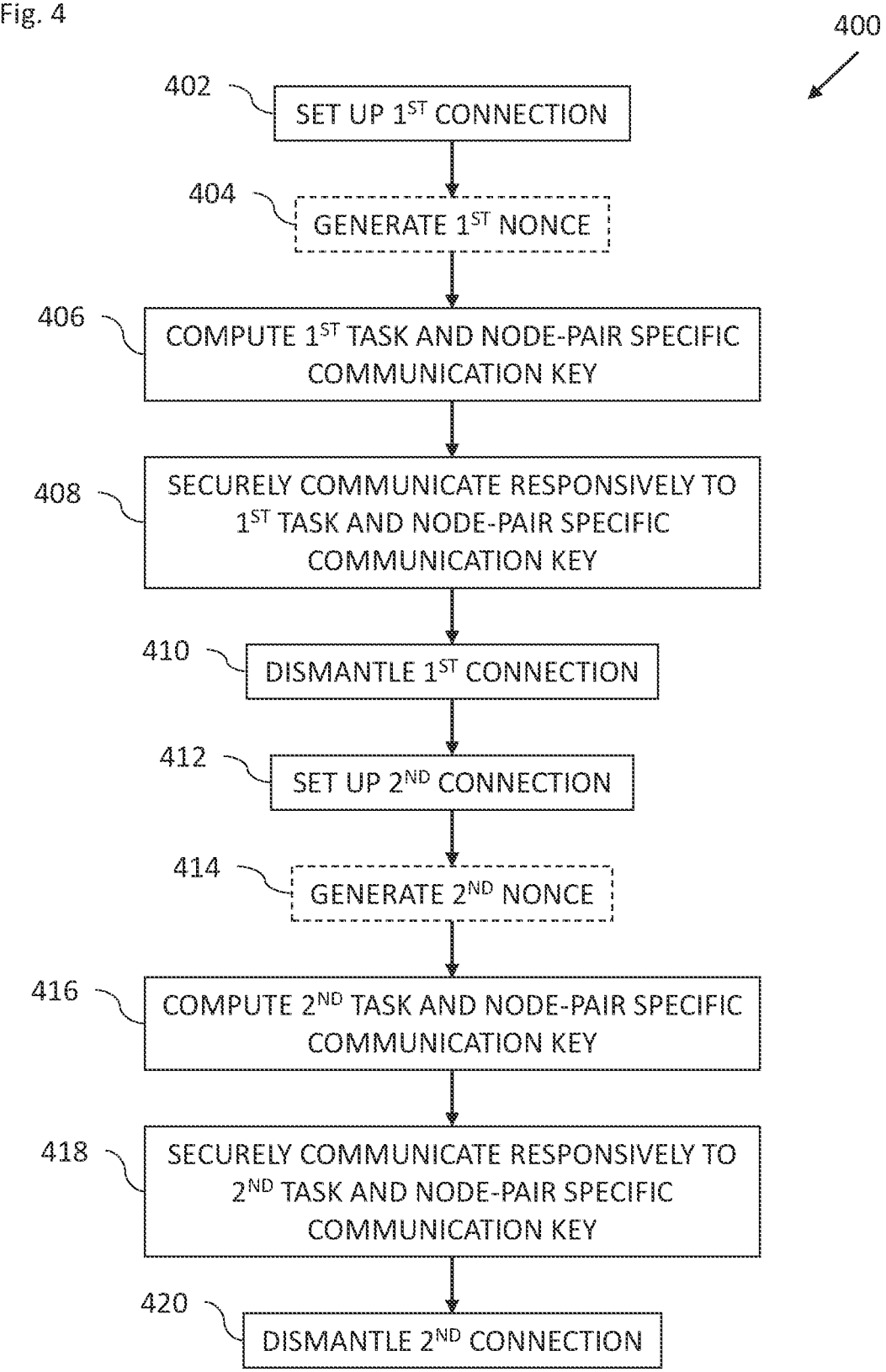
FIG. 4 is a flowchart including steps for a method of operation of a node in the system of FIG. 1.

Reference is now made to FIG. 4, which is a flowchart 400 including steps for a method of operation of a node 12 in the system 10 of FIG. 1. FIG. 4 describes one node setting up and dismantling two connections. The two connections may be active at the same time or at different times. The two connections may be for the same node pair or different node pairs.

The network interface controller 20 is configured to set up (block 402) a first connection (e.g., reserve hardware resources and set up a state) with a given one of the nodes 12, optionally generate (block 404) a first nonce (optionally responsively to a first connection request from the given node 12) or receive the first nonce from the given node 12, compute (block 406) a first task and node-pair specific communication key for the first connection responsively to the first nonce and/or address information of the node pair and the master key for the first task, securely communicate (block 408) with the given node 12 responsively to the first task and node-pair specific communication key, and dismantle (block 410) the first connection once communication is completed.

The network interface controller 20 is configured to set up (block 412) a second connection (e.g., reserve hardware resources and set up a state) with a given one of the nodes 12, optionally generate (block 414) a second nonce (responsively to a second connection request from the given node 12) or receive the second nonce from the given node 12, compute (block 416) a second task and node-pair specific communication key for the second connection responsively to the second nonce (different to the first nonce) and/or address information of the node pair and the master key for the second task, securely communicate (block 418) with the given node 12 responsively to the second task and node-pair specific communication key, and dismantle (block 420) the second connection once communication is completed.

Securely communicating may include one of the nodes encrypting data to send to the other node in the node pair for decryption (e.g., one-way secure communication), or both nodes encrypting data to send to each other for decryption by the other node in the pair (e.g., two-way secure communication).

Figure 5:
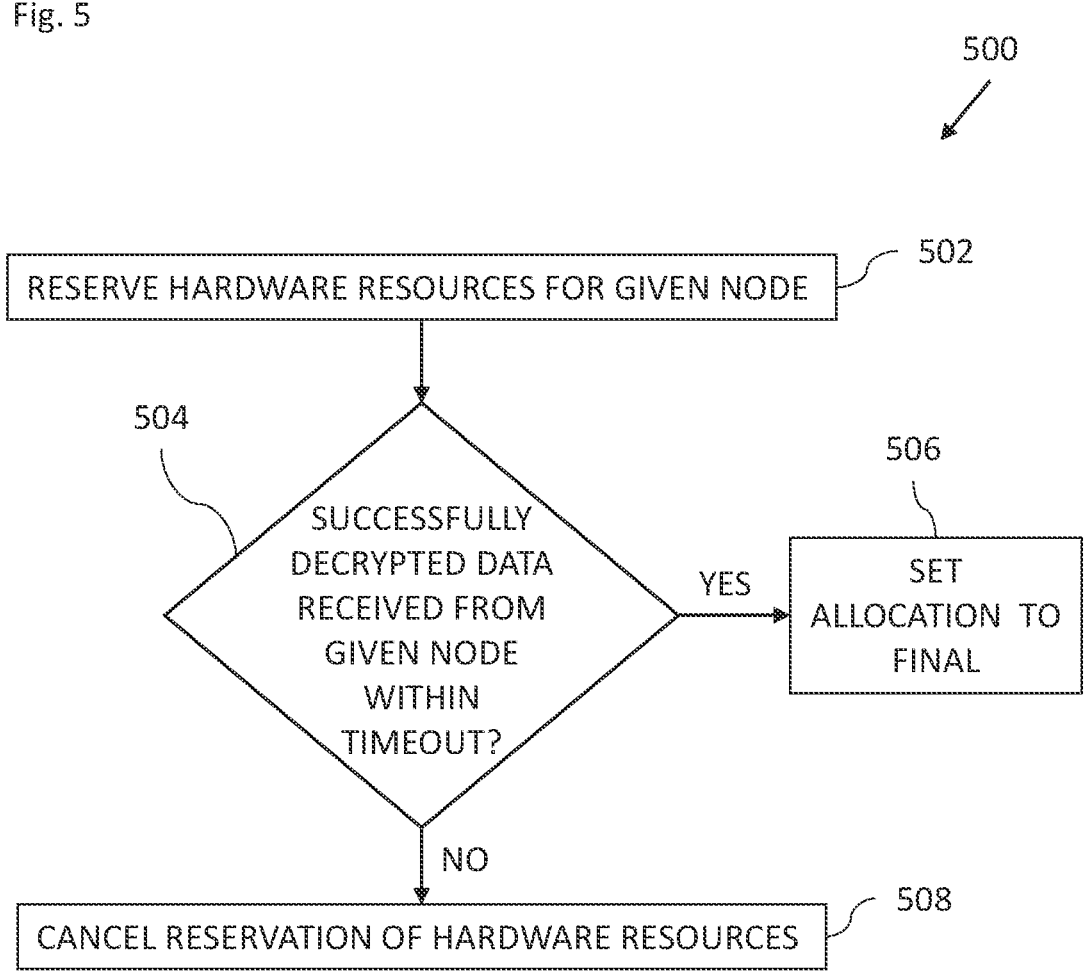
FIG. 5 is a flowchart including steps in a method of hardware resource reservation in the system of FIG. 1.

Reference is now made to FIG. 5, which is a flowchart 500 including steps in a method of hardware resource reservation in the system 10 of FIG. 1.

In some embodiments, a timeout may be used to prevent connections being set up and reserving resources without communication commencing. In this way, denial of service attacks may be prevented by an attacker who does not have access to the task master keys 24. Therefore, if communication does not start by the end of a timeout, the connection is dismantled, and hardware resources are released.

Therefore, the network interface controller 20 of node A is configured to reserve (block 502) hardware resources responsively to a request from node B to establish a connection with node A. At a decision block 504, the network interface controller 20 of node A is configured to check if data has been received from node B and that data has been successfully decrypted within a given timeout. If data has been received from node B and successfully decrypted, with the given timeout, the network interface controller 20 is configured to set the allocation of the connection resources to final (block 506) (i.e., without further checking the timeout). Responsively to not successfully decrypting data received from node B within the given timeout, the network interface controller 20 is configured to cancel reservation of the reserved hardware resources (block 508).

In other embodiments, a timeout is not implemented with respect to reserving resources and resource management may be handled in any suitable manner.

Various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

The embodiments described above are cited by way of example, and the present invention is not limited by what has been particularly shown and described hereinabove. Rather the scope of the invention includes both combinations and sub-combinations of the various features described hereinabove, as well as variations and modifications thereof which would occur to persons skilled in the art upon reading the foregoing description and which are not disclosed in the prior art.

What is claimed is:

1. A secure distributed processing system, comprising a plurality of nodes connected over a network, and configured to process a plurality of tasks, each respective one of the nodes including:
   a respective processor to process data of respective ones of the tasks; and
   a respective network interface controller (NIC) to:
   connect to other ones of the nodes over the network;
   store task master keys for use in computing communication keys for securing data transfer over the network for respective ones of the tasks;
   compute respective task and node-pair specific communication keys for securing communication with respective ones of the nodes over the network for respective ones of the tasks responsively to respective ones of the task master keys and node-specific data of respective pairs of the nodes; and
   securely communicate the processed data of the respective ones of the tasks with the respective ones of the nodes over the network responsively to the respective task and node-pair specific communication keys.

2. The system according to claim 1, wherein each respective one of the tasks is processed as a respective distributed process by more than one of the nodes.

3. The system according to claim 1, wherein respective ones of the tasks are performed for tenants.

4. The system according to claim 3, wherein the respective processor includes a graphics processing unit (GPU) configured to process data of respective ones of the tasks for respective ones of the tenants.

5. The system according to claim 4, wherein each respective one of the tasks is processed as a respective distributed process by more than one of the nodes.

6. The system according to claim 1, wherein one of the nodes in each of the respective pairs of the nodes is configured to generate a respective nonce, the node-specific data of each of the respective pairs of the nodes comprising the respective nonce.

7. The system according to claim 6, wherein the node-specific data of the respective pairs of the nodes comprise address information of the respective pairs of the nodes.

8. The system according to claim 1, wherein the node-specific data of the respective pairs of the nodes comprise address information of the respective pairs of the nodes.

9. The system according to claim 1, wherein the respective NIC is configured to compute the task and node-pair specific communication keys responsively to setting up new connections with the respective ones of the nodes over the network so that for each new connection with a respective one of the nodes the respective NIC is configured to compute a corresponding new task and node-pair specific communication key.

10. The system according to claim 9, wherein the respective NIC is configured to:
set up a first connection with a given one of the nodes;
compute a first task and node-pair specific communication key for the first connection responsively to a first nonce;
securely communicate with the given one of the nodes responsively to the first task and node-pair specific communication key;
dismantle the first connection;
set up a second connection with a given one of the nodes;
compute a second task and node-pair specific communication key for the second connection responsively to a second nonce, different to the first nonce; and
securely communicate with the given one of the nodes responsively to the second task and node-pair specific communication key.

11. The system according to claim 10, wherein each respective one of the tasks is processed as a respective distributed process by more than one of the nodes.

12. The system according to claim 10, wherein the respective NEC is configured to:
generate the first nonce responsively to a first connection request from the given one of the nodes; and
generate the second nonce responsively to a second connection request from the given one of the nodes.

13. The system according to claim 12, wherein the respective NIC is configured to:
compute the first task and node-pair specific communication key for the first connection responsively to the first nonce and address information of the respective node of the respective NIC and the given one of the nodes; and
compute the second task and node-pair specific communication key for the second connection responsively to the second nonce and the address information of the respective node of the respective NIC and the given one of the nodes.

14. The system according to claim 1, wherein the respective NIC is configured to:
reserve hardware resources responsively to a request from a given one of the nodes to establish a connection with the respective node of the respective NIC; and
cancel reservation of the hardware resources after a given timeout responsively to not successfully decrypting data received from the given one of the nodes.

15. A secure distributed processing method, comprising:
processing data of respective ones of a plurality of tasks;
connecting to other ones of a plurality of nodes connected over a network;
storing task master keys for use in computing communication keys for securing data transfer over the network for respective ones of the tasks;
computing respective task and node-pair specific communication keys for securing communication with respective ones of the nodes over the network for respective ones of the tasks responsively to respective ones of the task master keys and node-specific data of respective pairs of the nodes; and
securely communicating the processed data of the respective ones of the tasks with the respective ones of the nodes over the network responsively to the respective task and node-pair specific communication keys.

16. The method according to claim 15, wherein each respective one of the tasks is processed as a respective distributed process by more than one of the nodes.

17. The method according to claim 15, wherein respective ones of the tasks are performed for tenants by a graphics processing unit (GPU).

18. The method according to claim 15, further comprising generating a respective nonce for each of the respective pairs of the nodes, the node-specific data of each of the respective pairs of the nodes comprising the respective nonce.

19. The method according to claim 18, wherein the node-specific data of the respective pairs of the nodes comprise address information of the respective pairs of the nodes.

20. The method according to claim 15, wherein the computing includes computing the task and node-pair specific communication keys responsively to setting up new connections with the respective ones of the nodes over the network so that for each new connection with a respective one of the nodes a corresponding new task and node-pair specific communication key is computed.

21. The method according to claim 20, further comprising:
setting up a first connection with a given one of the nodes;
computing a first task and node-pair specific communication key for the first connection responsively to a first nonce;
securely communicating with the given one of the nodes responsively to the first task and node-pair specific communication key;
dismantling the first connection;
setting up a second connection with a given one of the nodes;
computing a second task and node-pair specific communication key for the second connection responsively to a second nonce, different to the first nonce; and securely communicating with the given one of the nodes responsively to the second task and node-pair specific communication key.

22. The method according to claim 21, further comprising:
generating the first nonce responsively to a first connection request from the given one of the nodes; and
generating the second nonce responsively to a second connection request from the given one of the nodes.

23. The method according to claim 22, wherein:
the computing the first task and node-pair specific communication key includes computing the first task and node-pair specific communication key for the first connection responsively to the first nonce and address information of the respective node of the respective NIC and the given one of the nodes; and
the computing the second task and node-pair specific communication key includes computing the second task and node-pair specific communication key for the second connection responsively to the second nonce and the address information of the respective node of the respective NIC and the given one of the nodes.

24. The method according to claim 15, further comprising:
reserving hardware resources responsively to a request from a given one of the nodes to establish a connection; and
cancelling reservation of the hardware resources after a given timeout responsively to not successfully decrypting data received from the given one of the nodes.

* * * * *